(12) United States Patent
Yoder et al.

(10) Patent No.: US 6,351,807 B1
(45) Date of Patent: Feb. 26, 2002

(54) DATA PROCESSING SYSTEM UTILIZING MULTIPLE RESISTER LOADING FOR FAST DOMAIN SWITCHING

(75) Inventors: Ron W. Yoder, Mesa; Russell W. Guenthner, Glendale; William A. Shelly, Phoenix; Eric Earl Conway, Mesa; Boubaker Shaiek; Claude Rabel, both of Phoenix, all of AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/160,904

(22) Filed: Sep. 25, 1998

(51) Int. Cl.[7] ............................. G06F 9/35; G06F 9/355; G06F 12/08; G06F 12/06
(52) U.S. Cl. ..................... 712/228; 712/213; 712/215; 711/208; 711/209; 709/108
(58) Field of Search ................................ 712/2, 4, 6, 9, 712/11, 14, 23, 208, 209, 228, 20, 201, 211, 22, 10, 13, 18, 28, 29, 41, 215, 36, 225, 213; 709/108, 168, 208, 173, 209, 125, 153, 126, 128, 129, 144, 400; 711/208, 209

(56) References Cited

U.S. PATENT DOCUMENTS 4,484,268 A * 11/1984 Thoma et al. ............... 712/212
5,659,785 A * 8/1997 Pechanek et al. ............ 712/11
5,864,689 A * 1/1999 Tran ........................... 712/208
6,081,884 A * 6/2000 Miller ......................... 712/204

* cited by examiner

Primary Examiner—Daniel H. Pan
(74) Attorney, Agent, or Firm—J. S. Solakian; J. H. Phillips

(57) ABSTRACT

A processor (40) in a data processing system simultaneously loads multiple registers (60) with a single value for fast domain switching. A domain switch instruction asserts a register block write signal (112) along with the register write signal (116) when block writing the single value to the set of registers (60). Register address lines (110, 111) are decoded in two sets: a first set of decoded address lines (110) specifying a block of registers; and the second set (111) specifying one register in the block of registers. When the register block write signal (112) is asserted during a register write, the second set of decoded address lines (111) are ignored, and all registers in the block of registers (60) selected by the first set of decoded address lines (110) are simultaneously loaded with a common value. Additional drive requirements are solved either by adding a buffer (226) to each register bit, or by disabling (228) the feedback path (215) in each register bit during block writes.

18 Claims, 5 Drawing Sheets

DATA PROCESSING SYSTEM UTILIZING MULTIPLE RESISTER LOADING FOR FAST DOMAIN SWITCHING

FIELD OF THE INVENTION

The present invention generally relates to data processing systems, and more specifically to selectively simultaneously writing a same value to a block of registers.

BACKGROUND OF THE INVENTION

Computer processors typically include in their instruction sets instructions for changing processor state. For example, many computer architectures include instructions to change from user mode to supervisory mode, and back. Indeed, without this sort of instruction, it is highly problematic whether architecture can do an adequate job in protecting one user from another, or the operating system from users.

In a modern operating system (OS), there are well-defined tasks that must be accomplished when an operating system dispatches user tasks and programs to execute, and when the operating system receives control back after such execution. Some of these tasks including loading and storing general-purpose registers and segment registers.

Some architectures, especially Reduced Instruction Set Computer (RISC) architectures, utilize long, often repeated, sequences of code to load and store these general purpose and segment registers. As this function is repeated whenever control is transferred to or received from a user program, this approach of utilizing long, often repeated, sequences of code can be quite costly. For that reason, specialized instructions have been added to some architectures to expedite this entire process. For example, the GCOS 8 architecture, owned by the assignee of this invention, includes a CLIMB instruction utilized to change from supervisory mode to user mode, and back. The CLIMB family of instructions performs all actions necessary to change from supervisory mode to user mode, and back in a single instruction.

Unfortunately, execution of such complex state changing instructions as the CLIMB can be quite expensive in terms of processor cycles required for execution. This is especially important in high volume transaction environments where it is necessary to switch back and forth, to and from supervisory mode to user mode quite often. It would thus be extremely useful if the number of computer cycles could be reduced when executing a complex state change instruction.

One place where a significant amount of time is spent during execution of complex state change instructions is in loading and restoring all of the registers required. This is typically done in a serial fashion, loading or storing one register at a time. Indeed, many modern computer processor architectures include instructions to load or store entire banks of registers. For example, the Unisys 1100/2200 computer architecture includes load and store multiple register instructions. Similarly, the IBM/Motorola PowerPC architecture contains Load Multiple Word (lmw) and Store Multiple Word (stwm) instructions for loading and storing entire banks of registers. However, as noted above, these instructions invariably operate in a serial fashion, loading or storing one register at a time. It would thus be advantageous for a computer architecture to provide a mechanism for overlapping, or parallelizing at least some register loading and/or storing.

BRIEF DESCRIPTION OF THE DRAWINGS

The features and advantages of the present invention will be more clearly understood from the following detailed description taken in conjunction with the accompanying Figures where like numerals refer to like and corresponding parts and in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

A processor includes means for simultaneously writing the same value to multiple registers at the same time. This is especially useful in implementing processor state change instructions that must load or store large numbers of registers. In implementing such processor state change instructions, there are often situations where a block of registers gets initialized to the same value. For example, upon initial dispatch, many operating systems initialize most, if not all, of the user accessible general registers to zero. There are also often requirements to initialize banks of segment registers to the same register value. The ability to load an entire block or bank of registers simultaneously with the same value thus in many cases can result in significantly reducing the number of cycles required to execute these instructions.

Figure 1:
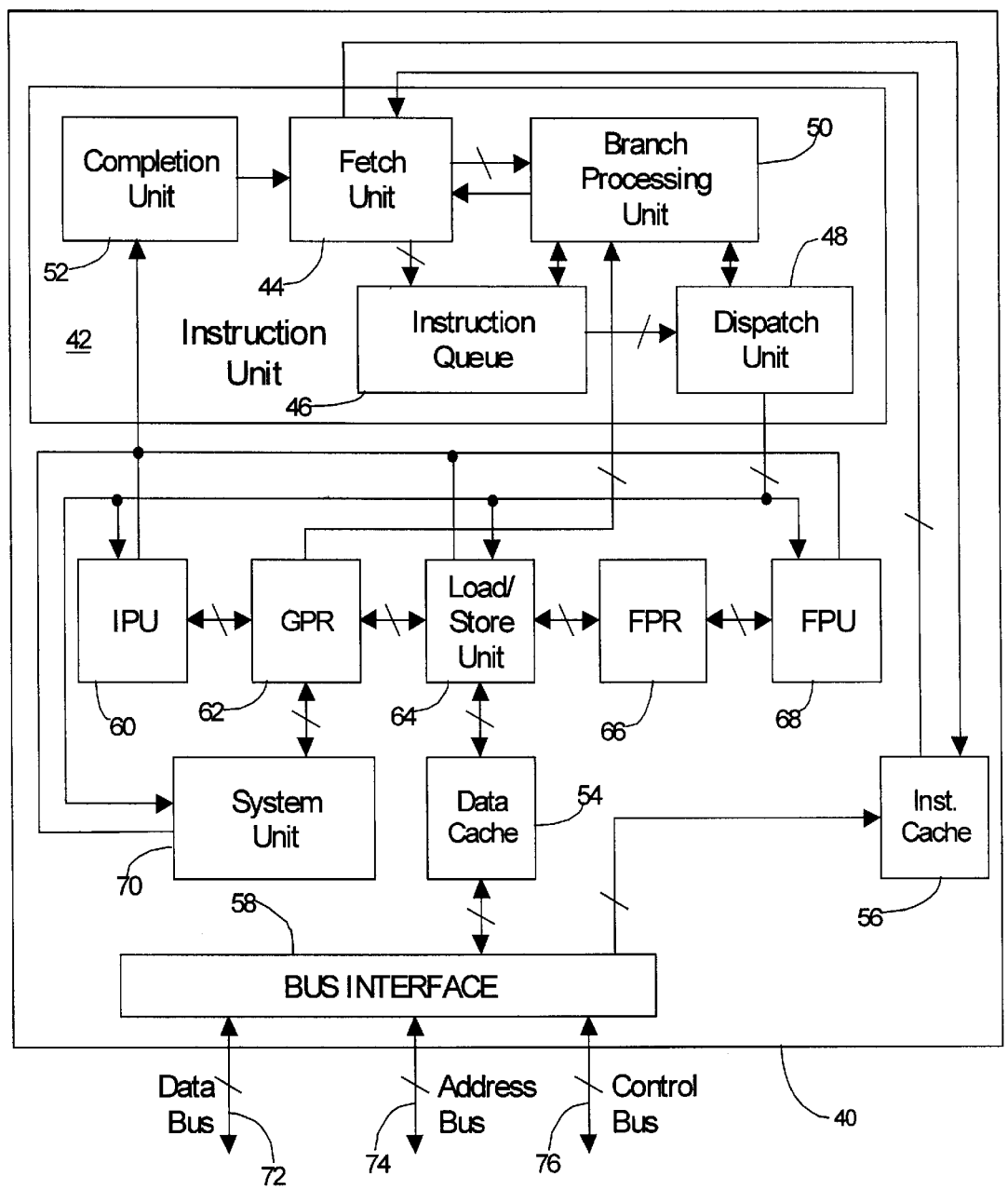
FIG. 1 is a block diagram of a processor in a data processing system, in accordance with the present invention.

FIG. 1 is a block diagram of a processor 40 in a data processing system, in accordance with the present invention. The processor 40 is coupled to a bus. The bus comprises a data bus 72, a address bus 74, and a control bus 76. Such a bus is typically implemented as a hierarchy of busses. In this instance, the data bus 72, address bus 74, and control bus 76 together comprise a processor bus. The data bus 72, the address bus 74, and the control bus 76 are coupled to a bus interface 58. The bus interface 58 is coupled to a data cache 54 and an instruction cache 56. The data cache 54 and the instruction cache 56 are typically constructed of high speed SRAM. The coupling between the data cache 54 and the bus interface 58 is typically bi-directional, whereas the coupling between the bus interface 58 and the instruction cache 56 is typically single directional, since there is typically no need to write instructions back to slower memory (not shown).

The instruction cache 56 is coupled to and provides instructions to an instruction execution unit 42. The instruction execution unit 42 shown provides for pipelined execution of multiple instructions, synchronization of out-of-order execution, and branch prediction. However, these optimizations are not necessary to practice this invention. The instruction execution unit 42 provides control signals to control execution of an Integer Processing Unit 60, a load/store unit 64, a floating point unit 68, and a systems unit 70. The load/store unit 64 is bidirectionally coupled to the general purpose registers 62, the floating point registers 66 and the data cache 54. The load/store unit 64 loads values into the general purpose registers 62 and floating point registers 66 from the data cache 54, and writes them back to the data cache 54, as required.

The general-purpose registers (GPR) 62 are bidirectionally coupled to and utilized by the integer processing unit 60 to perform integer arithmetic, as well as other logical functions. Such an integer processing unit 60 typically comprises logical/shift modules, integer addition/subtraction modules, and integer multiplication/division modules. The integer processing unit 60 will typically set condition code flags in one or more condition code registers in the general purpose registers 62 based on the results of the arithmetic and logical functions performed. These condition code flags are provided to the instruction execution unit 42 for use in conditional branching. In this preferred embodiment, the integer processing unit 60 provides for arithmetic and logical functions. The general-purpose registers 62 are also bidirectionally coupled to and utilized by the systems unit 70 to perform systems functions. These systems unit executes various system-level instructions, including instructions to change environment or state. In order to maintain system state, most of the instructions executed by the systems unit 70 are completion-serialized. The floating point registers 66 are bidirectionally coupled to and utilized by the floating point unit 68 to perform floating point arithmetic functions.

A single integer processing unit 60 and floating point unit 68 are shown in this FIG. This is done here for clarity. It should be understood that an alternate embodiment of the present invention includes multiple such functional units 60, 66. In such an alternative embodiment, a pipelined processor 40 such as shown here will typically contain multiple integer processing units 60 providing multiple concurrent integer computations, and multiple floating point units 68 providing multiple concurrent floating point computations.

The Instruction Unit 42 comprises an instruction fetch unit 44, an instruction queue 46, an instruction dispatch unit 48, a branch processing unit 50, and an instruction completion unit 52. The instruction fetch unit 44 is coupled to and receives instructions from the instruction cache 56. The instructions fetch unit 44 provides instruction fetch control signals to the instruction cache 56. Fetched instructions are transmitted upon demand from the instruction fetch unit 44 to the instruction queue 46 for queuing. The queued instructions are subsequently removed from the instruction queue 46 and dispatched to the function units 60, 64, 68, 70 for processing by the instruction dispatch unit 48. Multiple instructions will typically be in simultaneous execution at the same time in a pipelined system. Upon completion of each of the dispatched instructions, the completing function units 60, 64, 68, 70 provide instruction completion signals to the instruction completion unit 52. The instruction completion unit 52 is coupled to and thereupon notifies the instruction fetch unit 44 of the instruction completions, allowing for further instruction fetches.

The branch processing unit 50 is bidirectionally coupled to and receives branch instructions from the instruction fetch unit 44. The branch processing unit 50 is coupled to and receives condition code information from the general-purpose registers 62. This condition code information is utilized by the branch-processing unit 50 to perform conditional branching. Modern branch processing units 50 in many systems today perform branch prediction and instruction lookahead. When using branch prediction, such a branch-processing unit 50 will typically provide control signals to the instruction fetch unit 44 to continue to fetch instructions until an unresolved conditional branch is resolved. The contents of general-purpose registers 62 are also received by the branch-processing unit 50 for use in indexed and indirect branching.

The system unit 70 will typically contain circuitry to execute processor state change instructions. In the case of the GCOS 8 architecture, this would include the CLIMB instruction. Register control signals are provided by the system unit 70 to the general purpose register stack 62 to control reading and writing of registers when executing processor state change instructions. In order to reduce the number of cycles required to execute processor state change instructions, one of these register control signals: a register block write signal 112, is utilized to load multiple registers with a same value. This same mechanism is utilized by the load/store unit 64 for processing instructions that load multiple registers with a same value. Such multiple register loading with a single value may be dynamically detected by either the instruction dispatch unit 48 utilizing instruction look-ahead, or the load/store unit 64 when executing multiple load register instructions.

The processor 40 shown in FIG. 1 is based on a PowerPC processor manufactured by Motorola and IBM. This was done for illustrative purposes since that architecture is relatively well known, and has a localized set of registers 62, 66. The preferred embodiment is a GCOS 8 data processor sold by Bull Worldwide Information Systems. Such a processor utilizes a single cache, instead of the dual caches 54, 56 shown in FIG. 1. Additionally, the GCOS 8 data processor is not a superscaler processor. It has a single integer unit and floating point unit, with the floating point unit being used for more complex integer arithmetic.

Figure 2:
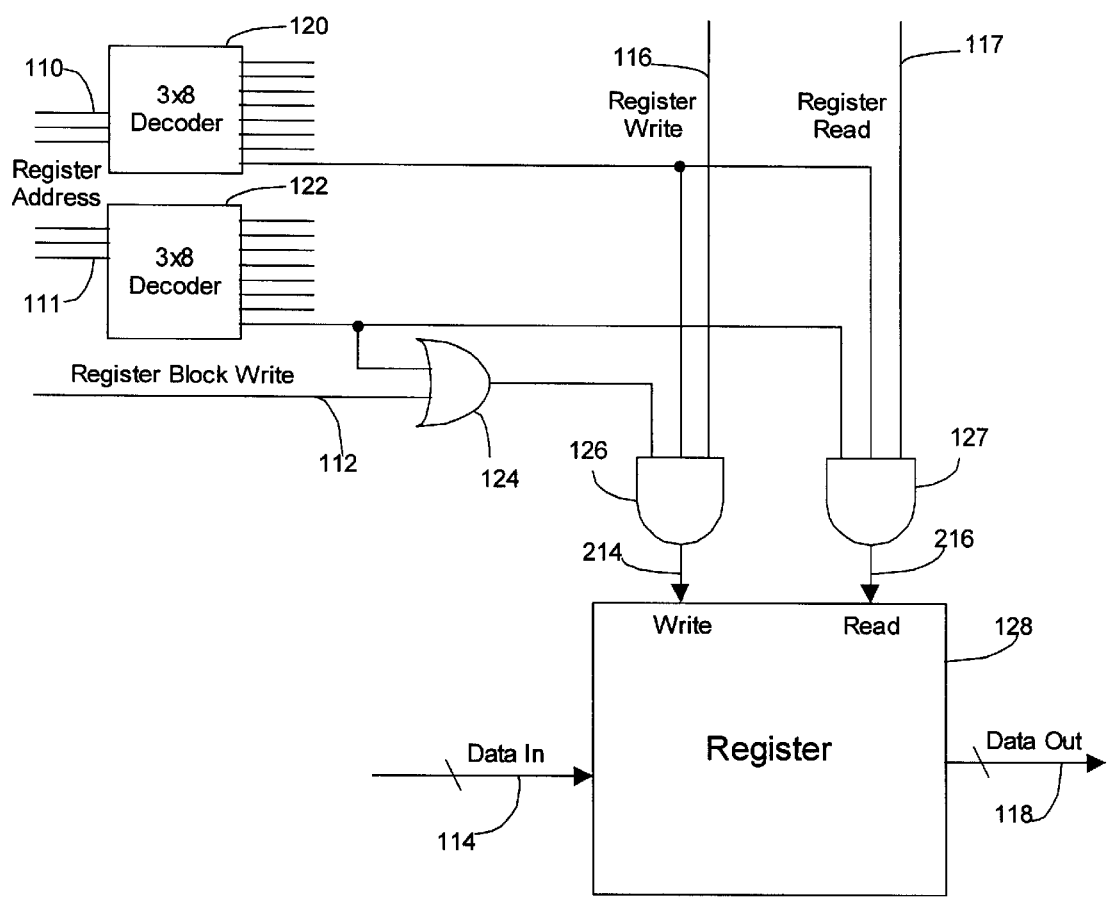
FIG. 2 is a block diagram illustrating a block loadable register in the general-purpose registers, in accordance with the present invention.

FIG. 2 is a block diagram illustrating a block loadable register 128 in the general-purpose registers 62. The block loadable register 128 stores a Data In signal 114 in response to a Write Word signal 214. The block loadable register 128 provides its contents on a Data Out signal line 118 in response to a Read Word signal 216. The Read Word signal 216 is received from a first three-input AND gate 127. One of the inputs to the first three-input AND gate 127 is a Register Read signal 117. A second input to the first three-input AND gate 127 is one of the eight outputs of a high order 3×8 address decoder 120. The third input to the first three-input AND gate 127 is one of the eight outputs of a low order 3×8 address decoder 122. Six register address lines 110, 111, address one of sixty-four potential registers through the use of the high order 3×8 address decoder 120 and the low order 3×8 address decoder 122. The high order 3×8 address decoder 120 receives and decodes the high order three register address lines 110, and the low order 3×8 address decoder 122 receives and decodes the low order three register address lines 111. The block loadable register 128 will thus present its contents on the Data Out lines 118 when the Register Read signal 117 is asserted, and both the high order address lines 110 and the low order register address lines 111 select this register.

The Write Word signal 214 is received from a second three-input AND gate 126. One of the inputs to the second three-input AND gate 126 is a Register Write signal 116. A second input to the second three-input AND gate 126 is the same one of the eight outputs of a high order 3×8 address decoder 120. The third input to the second three inputs AND gate 126 is received from a two-input OR gate 124. One of the inputs to the two-input OR gate 124 is the same one of the eight outputs of a low order 3×8 address decoder 122. The second input to the two-input OR gate 124 is a Register Block Write signal 112. The block loadable register 128 will thus register the contents of the Data In signals 114 when the Write signal 116 is asserted, the high order address lines 110 selects this register, and either the low order register address lines 111 select this register, or the Register Block Write signal 112 is asserted. Thus, when the Register Block Write signal 112 and the Register Write signal 116 are asserted at the same time, all of the registers that share the same high order address line 110 encoding are loaded or written with the same value. When the Register Block Write signal 112 is not asserted when the Register Write signal 116 is asserted, only a single register, selected by the register address signals 110, 111 registers the Data In signals 114.

The six Register Address signals 110, 111, the Register Block Write 112, Register Read signal 117, and Register Write signal 116 are register file control signals provided by other functional units, such as the system unit 70, load/store unit 64, and integer processing unit 60 to control reading and writing of the general purpose registers 62. Under normal operation, a register address is supplied on the Register Address signal lines 110, 111, which designate a single register to read or write. The Register Read signal 116 and Register Write signal lines 117, 116 are then used to designate whether the designated register is to be read or written. However, in the case of a register block write, the register block write function is designated by asserting the Register Write signal 116 along with the Register Block Write signal 112. Only the high order register address signal lines 110 are significant—the low order register signal lines 111 are ignored. In the case of a single or multiple register writes, all of the bits in the register or registers are typically loaded simultaneously on the Data In signal lines 114. Thus, in the case of a thirty-six (36) bit architecture, thirty-six (36) bits of data are loaded simultaneously into one or more thirty-six (36) bit registers on the thirty-six (36) Data In signal lines 114 comprising the Register Input Data bus. Similarly, in the case of register read, thirty-six (36) bits from a single thirty-six (36) bit register are simultaneously transmitted on thirty-six (36) Data Out signal lines 118 comprising the Register Output Data bus.

In this FIG., two 3×8 address decoders 120, 122 are utilized. This provides for eight groups of eight registers for a total of sixty-four registers. The Register Block Write signal 112 thus causes a block of eight registers to be written at a time. This is by way of example. Other configurations are within the scope of this invention. For example, specific register block write lines can be utilized to load a specific block of registers to a specified value. Different specific register block write lines would control different register blocks.

Figure 3:
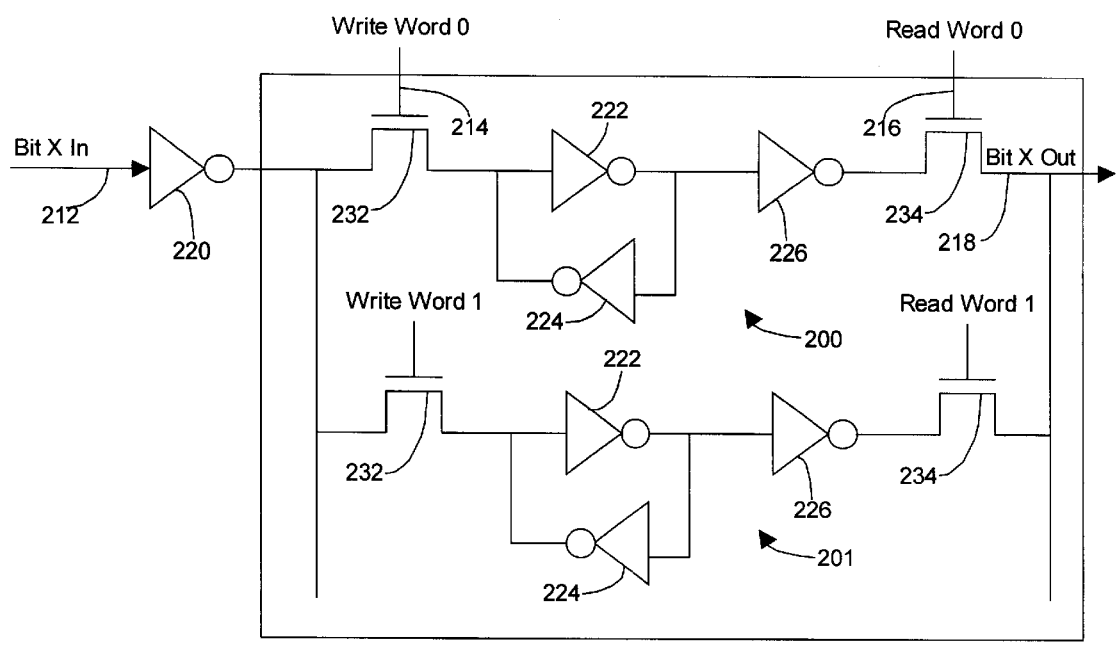
FIG. 3 is a block diagram illustrating a portion of a prior art general-purpose register file.

FIG. 3 is a block diagram illustrating a portion of a prior art general-purpose register file 62. A single bitslice ("X") of the register file 62 is shown. The bitslice X contains bit X for a block of registers. The signal line in the Register Data In 114 bus corresponding to Bitslice X provides a Bit X In signal 212. The Register Data Out 118 signals corresponding to Bitslice X is selectively generated from a Bit X Out signal 218.

The input bit ("X") 212 is received by a first inverter 220 for a set of registers. The first inverter 220 is coupled through a first transistor 232 to the input of a second inverter 222. This may alternatively be a non-inverting buffer. The gate of the first transistor 232 is connected to and controlled by a Write Word signal 214 for the register word to be written. The output of the second inverter 222 provides the input to a third inverter 224. The output of the third inverter 224 is connected to the input of the second inverter 222. The second inverter 222 and the third inverter 224 thus form a bistable feedback loop. The output of the second inverter 222 is connected to the input of a fourth inverter 226. This fourth inverter 226 may alternatively be a non-inverting buffer. The output of the fourth inverter 226 is coupled via a second transistor 234 to the Bit X Out 218 output signal line. The gate of the second transistor 234 is connected to and controlled by the appropriate Read Word signal 216. Multiple register bits 200, 201 are connected in parallel between the first inverter 220 and the Bit X Out 218 line. Logically, all of the registers in a given register file that share the same Bit X In 212 input signal lines and Bit X Out 218 output signal lines are similarly connected together in parallel.

In the prior art, only a single register can be selected at a given time. Thus, at most, a single Write Word 214, or Read Word 216 signal line would be asserted at a given time. The result of this is that drivers driving the Bit X In 212 input signal lines need only drive a single register bit cell. This is not the case however when a both the Write signal 116 and the Register Block Write signal 112 are asserted at the same time. When both are asserted at the same time, there is typically a need to drive an entire block of register bits at that time.

Figure 4:
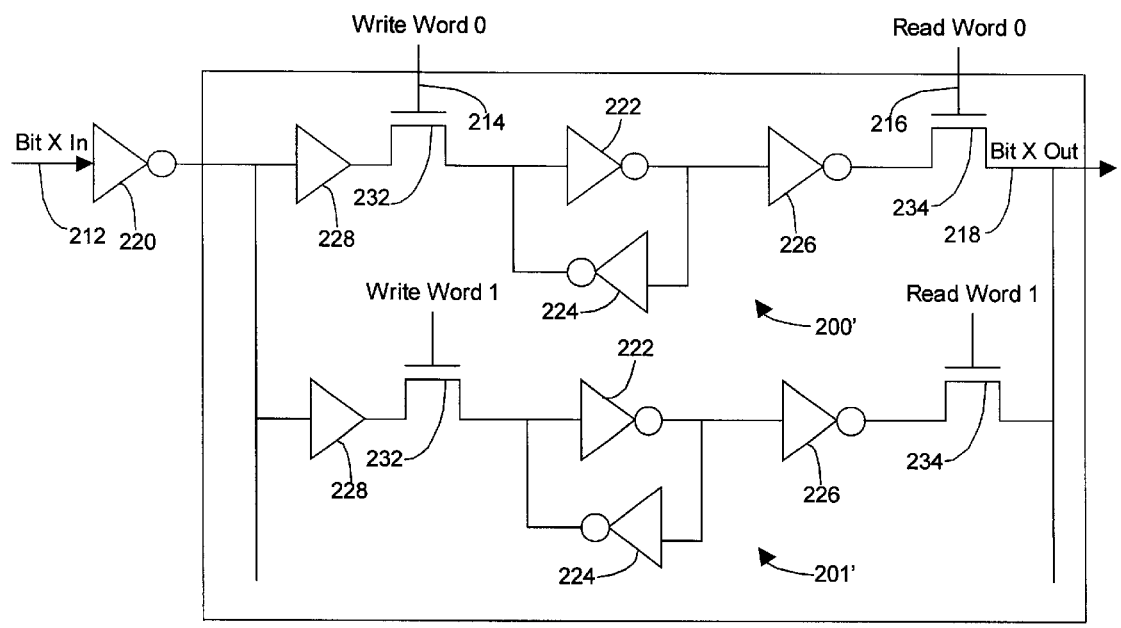
FIG. 4 is a block diagram illustrating a first embodiment of a register file bit slice that provides sufficient drive capacity to support Register Block Writes, in accordance with the present invention.

FIG. 4 is a block diagram illustrating a first embodiment of a register file bit slice that provides sufficient drive capacity to support Register Block Writes 112. FIG. 4 is similar to FIG. 3 with the exception that a buffer 228 has been connected between the first switch 232 and the first inverter 220 for all of the register bits in a specific register bit slice to provide the necessary drive capacity. FIG. 4 shows each register bit having its own additional driver buffer. In alternate embodiments (not shown), a single buffer 228 or set of cascaded buffers may be utilized to provide the needed drive strength.

Figure 5:
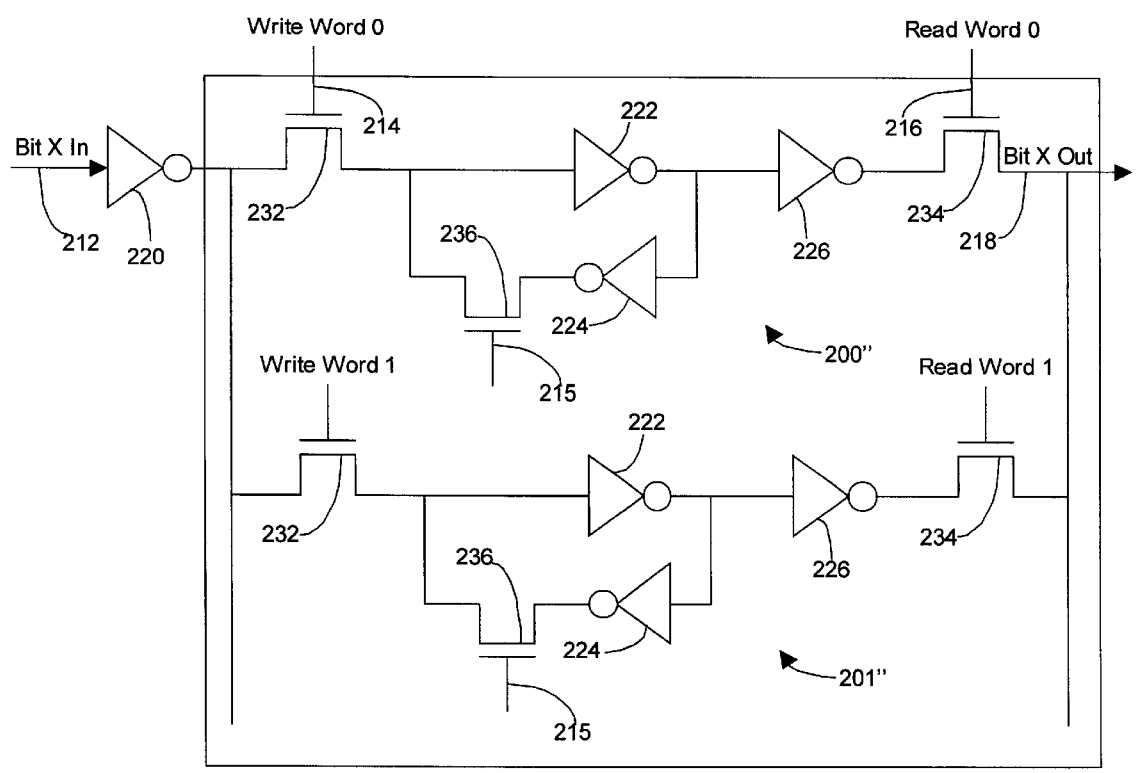
FIG. 5 is a block diagram illustrating a second embodiment of a register file bit slice that provides sufficient drive capacity to support Register Block Writes, in accordance with the present invention.

FIG. 5 is a block diagram illustrating a second embodiment of a register file bit slice that provides sufficient drive capacity to support Register Block Writes 112. FIG. 5 is similar to FIG. 3 with the exception that a third switch 236 is connected in series with the third inverter 224, with the output of the series circuit containing the output of the third inverter 224 connected to the input of the third transistor 236 connected to the input of the second inverter, and the output of the second inverter 222 still connected to the input of the third inverter 222. The gate of the third transistor 236 is connected to and controlled by a signal 215. The purpose of the third transistor 236 is to selectively disable the feedback loop consisting of the second inverter 222 and third inverter 224. When the feedback loop is disabled, driver requirements for the register block write are significantly reduced.

The gate of the third transistor 236 can thus be driven by either the Register Write signal 116, the Register Block Write signal 112, the Word Write signal 214, or a combination of any of those three signals.

In the above FIGS. 3, 4, and 5, the transistors 232, 234, and 236 shown in the above FIGS. 3, 4, and 5 are NMOS transistors. Other types of switches and transistors would by necessity be used instead of NMOS transistors in other types of electronic technology. Similarly, a bistable feedback loop with read and write transistor gates is shown forming register bits. Other register implementations are within the scope of this invention.

In the preferred embodiment, the Register Block Write functionality is implemented under control of the CLIMB family of instruction in the GCOS8 processor architecture. Eight segment registers are simultaneously loaded to contain the same segment value. This is significantly reduces the cost in computer resources required to change processor context when one of the CLIMB family of instructions is executed.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A processor comprising:
    a set of registers containing a plurality of registers having:
        a set of register input lines;
        a set of register output lines;
        a register read signal line having a first read signal logical state and a second read signal logical state;
        a register write signal line having a first write signal logical state and a second write signal logical state;
        a set of register address signal lines;
        a register block write signal line having a first block write logical state and a second block write logical state;
    wherein:
        when the register write signal line is in the first write signal logical state and the register address signal lines are in a first configuration of the set of register address signal lines:
            when the register block write signal line is in the first block write logical state:
                a first one of the set of registers is selected by the first configuration of the set of register address signal lines, and
                the set of register input lines are registered in the first one of the set of registers; and
            when the register block write signal line is in the second block write logical state:
                a first plurality of registers of the set of registers is selected by the first configuration of the set of register address signal lines, and
                contents of the set of register input lines are simultaneously registered in each of the first plurality of registers.

2. The processor in claim 1, wherein:
    when the register read signal line is in the first read signal logical state and the set of register address signal lines are in the first configuration of register address lines:
        the first one of the set of registers is selected by the first configuration of the set of register address signal lines, and
        contents of that first one of the set of registers are provided on the set of register output lines.

3. The processor in claim 1 wherein:
    when the register write signal line is in the first write signal logical state and the register address signal lines are in a second configuration of the set of register address signal lines:
        when the register block write signal line is in the first block write logical state:
            a second one of the set of registers is selected by the second configuration of the set of register address signal lines, and
            the set of register input lines are registered in the second one of the set of registers; and
        when the register block write signal line is in the second block write logical state:
            a second plurality of registers of the set of registers distinct from the first plurality of registers is selected by the second configuration of the set of register address signal lines, and
            contents of the set of register input lines are simultaneously registered in each of the second plurality of registers.

4. The processor in claim 3, wherein:
    when the register read signal line is in the first read signal logical state and the set of register address signal lines are in the second configuration of register address lines:
        the second one of the set of registers is selected by the first configuration of the set of register address signal lines, and
        contents of that second one of the set of registers are provided on the set of register output lines.

5. The processor in claim 1 wherein:
    each of the set of registers comprises a plurality of register bits;
    each of the plurality of register bits comprises:
        a buffer having an input and an output, with the input to the buffer being responsively coupled to one of the set of register input lines;
        a write enable transistor having an input, and output, and a gate, with its input responsively coupled to the output of the buffer and its gate responsively coupled to the register write signal line;
        a feedback loop having an input and an output, with the input of the feedback loop being responsively coupled to the output of the write enable transistor,
        a read enable transistor having an input, an output, and a gate, with its input responsively coupled to the output of the feedback loop, its gate responsively coupled to the register read signal line, and its output coupled to and providing a signal to one of the set of register output lines; and
    a plurality of register bits from a corresponding plurality of registers are coupled in parallel, with the input of the buffer in each of the plurality of register bits being coupled together, and the output of the read enable transistor in each of the plurality of register bits being coupled together.

6. The processor in claim 5 wherein for each of the plurality of register bits in each of the set of registers, wherein:
    the feedback loop comprises:
        a first inverter having an input and an output, with its input receiving the input to the feedback loop, a second inverter having an input and an output, with its input responsively coupled to the output of the first inverter and its output coupled to the input of the first inverter, and a third inverter having an input and an output, with its input responsively coupled to the output of the first inverter and its output providing the output of the feedback loop.

7. The processor in claim 1 wherein:

each of the set of registers comprises a plurality of register bits;

each of the plurality of register bits comprises:

a buffer having an input and an output, with the input to the buffer being responsively coupled to one of the set of register input lines;

a write enable transistor having an input, an output, and a gate, with its input responsively coupled to one of the set of register input lines and its gate responsively coupled to the register write signal line;

a feedback loop having an input and an output, with the input of the feedback loop being responsively coupled to the output of the write enable transistor, wherein the feedback loop comprises:

a first inverter having an input and an output, with its input providing the input to the feedback loop, a second inverter having an input and an output, with its input responsively coupled to the output of the first inverter, a block write transistor having an input, an output, and a gate, with the input of the block write transistor being responsively coupled to the output of the second inverter and its output coupled to the input of the first inverter, and a third inverter having an input and an output, with its input responsively coupled to the output of the first inverter and its output providing the output of the feedback loop, a read enable transistor having an input, an output, and a gate, with its input responsively coupled to the output of the feedback loop, its gate responsively coupled to the register read signal line, and its output coupled to and providing a signal to one of the set of register output lines; and a plurality of register bits from a corresponding plurality of registers are coupled in parallel, with the input of the buffer in each of the plurality of register bits being coupled together, and the output of the read enable transistor in each of the plurality of register bits being coupled together.

8. The processor in claim 7 wherein for each of the plurality of register bits in each of the set of registers:

the gate from the block write transistor is responsively coupled to the register block write signal line; and the gate from the block write transistor is open when the register block write signal line is in its first block write logical state.

9. The processor in claim 7 wherein for each of the plurality of register bits in each of the set of registers:

the gate from the block write transistor is responsively coupled to the register write signal line; and the gate from the block write transistor is open when the register write signal line is in its first write signal logical state.

10. The processor in claim 7 wherein for each of the plurality of register bits in each of the set of registers:

the gate from the block write transistor is responsively coupled to the register write signal line and to the register block write signal line; and the gate from the block write transistor is open when either the register write signal line is in its first write signal logical state or the register block write signal line is in its first block write logical state.

11. A processor having a register file, wherein:

the register file comprises:

a plurality of registers, each comprising a plurality of register bits;

a set of register input lines coupled to and providing input to each of the plurality of registers;

a set of register output lines responsively coupled to each of the plurality of registers;

a register read signal line coupled to each of the plurality of registers and having a first read signal logical state and a second read signal logical state;

a register write signal line coupled to each of the plurality of registers and having a first write signal logical state and a second write signal logical state;

a set of register address signal lines;

a register block write signal line coupled to each of the plurality of registers and having a first block write logical state and a second block write logical state;

wherein:

when the register write signal line is in the first write signal logical state and the register address signal lines are in a first configuration of the set of register address signal lines:

when the register block write signal line is in the first block write logical state:

a first one of the plurality of registers is selected by the first configuration of the set of register address signal lines as the first selected register, and the set of register input lines are registered in the first selected register; and when the register block write signal line is in the second block write logical state:

a first plurality of registers of the plurality of registers is selected as a first selected set of registers by the first configuration of the set of register address signal lines, and contents of the set of register input lines are simultaneously registered in each of the first selected set of registers.

12. The processor in claim 11, wherein:

when the register read signal line is in the first read signal logical state and the set of register address signal lines are in the first configuration of register address lines:

the first one of the plurality of registers is selected by the first configuration of the set of register address signal lines as the first selected register, and contents of the first selected register are provided on the set of register output lines.

13. The processor in claim 11 wherein:

when the register write signal line is in the first write signal logical state and the register address signal lines are in a second configuration of the set of register address signal lines:

when the register block write signal line is in the first block write logical state:

a second one of the plurality of registers is selected by the second configuration of the set of register address signal lines as the second selected register, and the set of register input lines are registered in the second selected register; and when the register block write signal line is in the second block write logical state:

a second plurality of registers of the plurality of registers is selected as a second selected set of registers by the second configuration of the set of register address signal lines, and contents of the set of register input lines are simultaneously registered in each of the second selected set of registers.

14. The processor in claim 13, wherein:

when the register read signal line is in the first read signal logical state and the set of register address signal lines are in the second configuration of register address lines:

the second one of the plurality of registers is selected by the first configuration of the set of register address signal lines as the second selected register, and contents of that second selected register are provided on the set of register output lines.

15. The processor in claim 11 wherein:

the register file further comprises:

a first decoder responsively coupled to a first subset of the register address signal lines and generating a first set of decoded register address signals that select one of a plurality of sets of registers as the first selected set of registers, and a second decoder responsively coupled to a second subset of the register address signal lines and generating a second set of decoded register address signals that select one of the selected set of registers as the first selected register.

16. The processor in claim 15 wherein:

each of the plurality of registers is coupled to and selectively provides signals to the set of register output lines;

each of the plurality of registers has a write enable input that enables registering an input value from the set of register input lines; and the write enable input for one of the plurality of registers is asserted when the register write signal is in its first logical state and a corresponding one of the first set of decoded register address signals is asserted and either a corresponding one of the second set of decoded register address signals is asserted or the block write signal line is in its first logical state.

17. The processor in claim 16 wherein:

each of the plurality of registers is responsively coupled to the set of register input lines;

each of the plurality of registers has a read enable input that selectively provides an output value on the set of register output lines; and the read enable input for one of the plurality of registers is asserted when the register read signal is in its first logical state and a corresponding one of the first set of decoded register address signals is asserted and a corresponding one of the second set of decoded register address signals is asserted.

18. A processor capable of executing a context switching instruction that simultaneously loads a single value into a plurality of segment descriptor registers, comprising:

a register file comprising the plurality of segment descriptor registers;

an instruction decode unit that decodes the context switching instruction; and control logic that simultaneously writes the single value into the plurality of segment descriptor registers in response to execution of the context switching instruction.

* * * * *